May 27, 1958  H. J. SHAFER  2,836,192
AUTOMATIC REOPENING SYSTEM FOR PIPE LINE VALVE
Filed Oct. 17, 1956
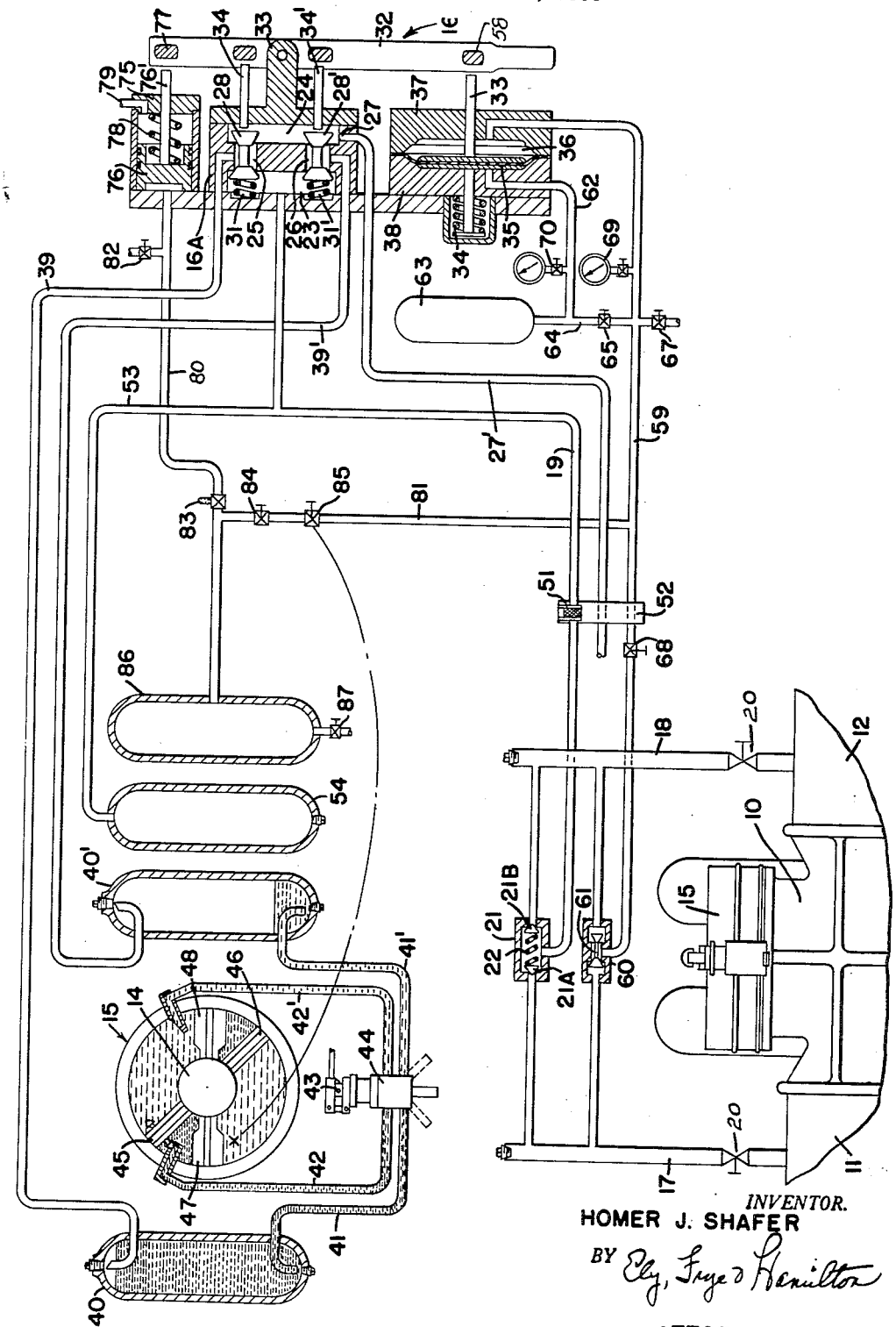
INVENTOR.
HOMER J. SHAFER
BY Ely, Frye & Hamilton
ATTORNEYS

2,836,192

AUTOMATIC REOPENING SYSTEM FOR PIPE LINE VALVE

Homer J. Shafer, Mansfield, Ohio, assignor to Shafer Valve Company, Mansfield, Ohio, a corporation of Ohio Application October 17, 1956, Serial No. 616,563

4 Claims. (Cl. 137—488)

The invention relates to a hydraulic control system of the type shown in my copending application Serial No. 348,354, filed April 13, 1953, of which the present application is a continuation-in-part for automatically closing a pipe line valve by a predetermined rate of pressure drop in the pipe line. More particularly, the invention relates to a system for automatically reopening the pipe line valve if the pressure drop causing automatic closing of the valve exists for only a short time, after which normal or adequate working pressure is restored to the line.

In the operation of a pipe line valve, pressure fluctuations of short duration frequently occur, as for example when a supply line is suddenly connected to the main line, and the resulting rate of pressure drop is often sufficient to actuate the controls and cause operation of the hydraulic motor which closes the valve. Reopening of the valve is normally accomplished manually or by auxiliary means operated only after determination of and, if necessary, remedying the cause of pressure drop, which necessitates a substantial delay in reopening the valve, with an unnecessary and expensive shutting off of the gas supply in the main line.

The primary object of the present invention is to provide a novel and improved system whereby if the drop in pressure automatically causing closing of the main valve is only temporary or is of insufficient magnitude to require the main valve to stay closed, the main valve will automatically be reopened.

Another object is to provide means for causing a predetermined time delay between the closing and reopening of the main valve.

Other objects include the provision of a simple and inexpensive reopening system which is easily adapted to the automatic valve closing system.

These objects, and others which will be apparent from the following description, are accomplished by the improved system comprising the present invention, a preferred embodiment of which is shown by way of example in the accompanying drawing, and described in detail herein. Various modifications and changes in details are understood to be within the scope of the invention as defined in the appended claims.

The figure of the drawing is a schematic view of the improved reopening system applied to the control system for operating a hydraulic motor operator to close the main valve in a pipe line when a predetermined rate of pressure drop occurs in the line.

The pipe line valve is shown at 10 connected between two sections 11 and 12 of a high pressure pipe line. The valve may be of the rotary plug type with its stem connected to the rotor 14 of the hydraulic rotary vane motor indicated generally in cross section at 15. The pressure fluid which furnishes the power for operating the motor 15 under certain predetermined conditions may be derived from the pipe line or other source, and it may be gas, air or liquid under pressure.

The pipe line is shown connected to a control valve unit indicated generally at 16 and the control unit is connected to the motor 15. Preferably, tap lines 17 and 18 from pipe line sections 11 and 12 are both connected to a power line 19 for supplying fluid pressure to the control unit 16 for operating the same. Shut-off valves 20 are provided in the lines 17 and 18. Thus, in the event there is a failure or break in the line on one side of the valve, the power line will be supplied from the pipe line on the high pressure side of the valve. However, the power line can be connected to one side or the other of the valve 10, if desired. In the arrangement shown in the drawing, the tap lines 17 and 18 are connected to the ends of a double check valve 21 having valve elements 21A and 21B normally urged into closed position by a compression spring 22 interposed between the elements. The power line 19 is connected into the side of the check valve 21 between the elements.

In this arrangment, if there is a differential pressure in the pipe line sections 11 and 12, the higher pressure will open the double check valve on that side to connect with power line 19, while closing the check valve on the other side. For example, if the pressure in tap line 17 is higher than that in line 18, valve element 21A will open, connecting line 17 with power line 19, and valve element 21B will be closed by the spring 22. If the pressure in line 18 is higher than that in line 17, valve element 21B will open and valve element 21A will close. Thus the valve elements selectively prevent the return flow from the power line to the low pressure side of the pipe line.

The power line 19 is connected to the pressure chamber of a reversing valve 16A which is part of the control unit 16. The valve 16A has an exhaust chamber 24 communicating with chamber 23 through ports 25 and 26, and the exhaust chamber 24 communicates with the atmosphere through an exhaust port 27 and conduit 27'. Double-headed poppet valves 28 and 28' are movably mounted in the ports 25 and 26, respectively. The heads of valves 28 and 28' are adapted to close off the upper ends of ports 25 and 26 in one position, and to close off the lower ends of said ports in another position. Coil springs 31 and 31' normally urge heads at one end of both valves against the lower ends of said ports when the valve is in neutral position as shown in the drawing.

A handle 32, for actuating the two poppet valves 28 and 28', is pivoted on the control valve housing on an arm 33 located between the poppet valves, and the handle has operatively associated therewith actuating rods 34 and 34' on opposite sides of the arm 33 and extending downwardly into the chamber 24, for selectively closing the adjacent valve heads against the upper ends of the ports 25 and 26 as the handle 32 is rocked on its pivot. The outer end of the handle is arranged to be actuated by a pressure-operated pilot element, which may be a part of the control valve unit 16. The pilot element preferably has a shaft or stem 33 connected to a flexible diaphragm 35 which spans a chamber 36 formed between housing sections 37 and 38, the marginal edge of the diaphragm being clamped between the housing sections.

The ports 25 and 26 of the reversing valve are connected intermediate their ends by conduits 39 and 39', respectively, to the hydraulic motor 15, and the pressure fluid in the conduits is arranged to force a liquid such as oil into the pressure side of the motor and out of the exhaust side in a closed circuit, so that flow to and from the motor can be more effectively controlled. Conduit 39 connects port 25 to the upper end of an oil cylinder 40 and conduit 39' connects port 26 to the upper end of an oil cylinder 40'. The lower end of cylinder 40 is normally connected by conduits 41 and 42 to one side of the motor, and the lower end of cylinder 40' is normally connected by conduits 41' and 42' to the opposite side of the motor.

For the purpose of operating the motor manually, a hand pump 43 and reversing valve 44 may be provided for forcing oil out of one cylinder into the motor and exhausting it from the motor into the other cylinder. However, in the neutral position of the valve 44 which controls the pump 43 (shown in full lines) the conduits 41 and 42 are connected together and conduits 41' and 42' are connected together, bypassing the hand pump 43.

The rotor 14 of the motor preferably has two diametrically opposite vanes 45 and 46 which rotate between stationary shoes 47 and 48. The conduit 42 supplies oil under pressure to the chamber on one side of the vane 45 and a cross port in the rotor connects that chamber to the chamber on the other side of opposite vane 46 so that equal pressure on both vanes turns the rotor in a clockwise direction to close the main valve 10. Similarly, a cross port connects the chambers on the exhaust sides of both vanes so that oil is exhausted from both of those chambers through conduit 42'. By reversing the flow through conduits 39 and 39', the motor is rotated in a counterclockwise direction to open the valve 10.

The construction of the motor 15 may be as shown in my copending application Serial No. 333,496, filed January 27, 1953, now Patent No. 2,778,338 of January 22, 1957, and per se forms no part of the present invention.

As indicated in the drawing the power line may have a filter 51 therein which is shown conveniently mounted in a control junction block 52, and the power line is preferably connected by a conduit 53 to a power or storage tank 54. Thus, if the pressure in both pipe line sections 11 and 12 should drop off so rapidly, due to a line break, that insufficient pressure would be available to operate the motor 15, the pressure previously stored in tank 54 would serve to operate the motor.

The stem 33 of the diaphragm member is normally urged away from the handle 32 by compression spring 34 engaging the opposite end of the stem. The handle has an abutment 58 thereon which is normally spaced from the end of the stem to make a lost-motion connection therewith when the stem is urged toward the handle. This lost-motion connection permits manual operation of the handle without affecting the normal position of the stem.

The end of the pilot chamber adjacent to the handle is connected to the pipe line by a conduit 59, and preferably the conduit 59 is connected into the side of a shuttle valve 60, which is connected at opposite ends to the tap lines 17 and 18. For convenience, the conduits 27' and 59 may be mounted in the junction block 52, along with the conduit 19. The valve 60 includes a double-headed valve element 61 movable in a port connecting the ends of the valve and the conduit 59 is connected to said ports between the heads of element 61. Thus the function of the shuttle valve is substantially opposite to that of the double check valve 21, in that it provides for always connecting the conduit 59 to the low pressure side of the pipe line, because the pressure from the high side will move the valve element 61 to close off the conduit 59 from connection with the high side and connect it to the low side.

The opposite end of the pilot chamber is connected by a conduit 62 to a storage tank 63 and conduit 62 is connected by a conduit 64 to the conduit 59. In the conduit 64 is an adjustable restricted orifice represented by valve 65. Connected to conduit 59, preferably adjacent to its connection with the conduit 64, is a blow-down valve 67. Between the blow-down connection and the shuttle valve 60 is a normally open shut-off valve 68 in the conduit 59. Pressure gauges 69 and 70 may be connected to the conduits 59 and 62 adjacent to the pilot element.

In order to adjust the restricted orifice 65 to provide for operating the diaphragm 35 at a desired rate of pressure drop to swing the rear end of handle 32 outwardly, thus connecting the power line 19 to conduit 39 for closing the main valve, valve 68 is closed and blow-down valve 67 is opened gradually to simulate a pressure drop in the pipe line. The manner of adjusting the orifice 65 to operate the diaphragm at a desired rate of pressure drop is fully described in my copending application Serial No. 507,785, filed May 12, 1955, of which the present application is a continuation-in-part and per se forms no part of the present invention.

The present invention relates specifically to the manner of automatically reopening the valve 10 after it has been closed due to a pressure drop in the line at a rate sufficient to actuate the pilot diaphragm 35 and thus operate the reversing valve and motor 15 to close the valve. The automatic reopening operation follows a predetermined time lapse after closing pressure is restored in the line to a value sufficient for continuing operation.

In the present system, the control valve unit 16 includes a pilot cylinder 75 having a piston 76 therein and carrying a piston rod 76' adapted to engage a shoulder 77 on the front end of handle 32 with a lost-motion connection, to actuate the handle in a reverse direction, reversing the flow through conduits 39 and 39' and reopening the main valve 10. A spring 78 in one end of cylinder 75 normally urges the piston to inoperative position and that end of the cylinder exhausts to atmosphere through a port 79. The other end of the cylinder 75 is connected by conduits 80 and 81 to the conduit 59 which is connected to the pipe line on the low pressure side of the valve 10, as previously described.

The conduit 80 has an orifice valve 82 therein for bleeding the pressure side of cylinder 75, and also has a pressure relief valve 83 therein which may be set to open at a desired predetermined minimum pressure. Conduit 81 has an adjustable orifice valve 84 therein and a shut-off valve 85 is located between orifice valve 84 and conduit 59. Between the orifice valve 84 and the pressure relief valve 83 the conduit 81 is connected to a reservoir or tank 86, which has an orifice valve 87 at one end for bleeding the reservoir.

The shut-off valve is operatively connected by suitable means, mechanical or otherwise, to the main valve 10, or as shown, to the rotor 14 of valve-operating motor 15, so that when the rotor completes its stroke clockwise to close the main valve 10, the shut-off valve is automatically opened. This connection is indicated in the drawing by the chain line extending from the shut-off valve to the valve closing position of one of the vanes. As soon as the shut-off valve opens, whatever pressure there is in the line on the low pressure side of the valve causes a flow in conduit 81 to orifice valve 84. The orifice valve 84 is set wider open than bleed orifice 87 so that pressure builds up in reservoir 86 after a predetermined lapse of time depending upon the difference in the size of the orifices 84 and 87.

The pressure relief valve is set to open when the pressure behind it builds up to a value predetermined to be the minimum pressure in the pipe line for adequate working requirements. Such value may be the same or something less than the original pressure in the line before the pressure drop occurred and closed the valve 10. When the predetermined value is reached, the pressure relief valve opens, operating piston 76 to actuate control valve 16 and reverse the flow through conduits 39 and 39', reopening the main valve 10.

As motor 15 starts to reopen the valve 10, the movement of the rotor automatically closes shut-off valve 85, and the built-up pressure in reservoir 86 continues to hold pressure relief valve open and operate the piston 76.

After the valve 10 is fully opened, pressure in the reservoir bleeds out through orifice valve 87, allowing the pressure relief valve to close, and pressure behind piston 76 bleeds out through orifice valve 82, allowing the piston to return to inoperative position and the control handle to be returned to neutral by the springs 31 and 31'. The system is then ready to go through another valve closing cycle when another pressure drop occurs, followed by a reopening cycle when the pressure in the line is restored to the predetermined value for which the pressure relief valve is set.

If after the main valve is closed by a pressure drop in the line, the pressure does not build up to the predetermined minimum necessary to open the pressure relief valve, as in the case of a break in the pipe line, whatever pressure there is in the line will pass through the orifice valve 84 into the reservoir 86 and bleed out of the reservoir through orifice valve 87 without opening the pressure relief valve 83, and the main valve 10 will stay closed until the break is repaired.

The system including the hydraulic motor 15, the control unit 16 and the conduits connecting these elements to the main valve in the pipe line, may be termed a preloaded system for closing the valve in response to a pressure drop in the line, and the present invention provides for automatically actuating said system to reopen said valve when the pressure in the line is restored to a predetermined value after a predetermined lapse of time.

What is claimed is:

1. In a fluid operator control system for a valve in a pipe line including a fluid pressure responsive valve operator operatively connected to said valve, and a fluid pressure responsive control valve having fluid communication with said valve operator and said pipe line for actuating said operator to close the main valve automatically in response to a pressure drop in the line; pressure-responsive pilot means operatively connected to said control valve for operating said control valve to reopen the main valve, conduit means connecting said pilot means to the pipe line, a pressure relief valve in said conduit means, a reservoir connected to said conduit means between the pressure relief valve and said pipe line, orifice means in said conduit means regulating the rate of flow from said pipe line to said reservoir, and a shut-off valve in said conduit means between said pipe line and said orifice means having an operative connection with said main valve for operation of said shut-off valve by closure of said main valve.

2. In a fluid operator control system for a valve in a pipe line including a fluid pressure responsive valve operator operatively connected to said valve, and a fluid pressure responsive control valve having fluid communication with said valve operator and said pipe line for actuating said operator to close the main valve automatically in response to a pressure drop in the line; pressure-responsive pilot means operatively connected to said control valve for operating said control valve to reopen the main valve, bleed means in communication with said pilot means normally to cause the return of said pilot means to neutral position, conduit means connecting said pilot means to the pipe line, a pressure relief valve in said conduit means between said pilot means and said pipe line, a reservoir connected to said conduit means between the pressure relief valve and said pipe line, orifice means in said conduit means regulating the rate of flow from said pipe line to said reservoir, a shut-off valve in said conduit means between said pipe line and said orifice means having an operative connection with said main valve for operation of said shut-off valve by closure of said main valve, and bleed means connected to said reservoir.

3. In a fluid operator control system for a valve in a pipe line including a fluid pressure responsive valve operator operatively connected to said valve, and a fluid pressure responsive control valve having fluid communication with said valve operator and said pipe line for actuating said operator to close the main valve automatically in response to a pressure drop in the line; pressure-responsive pilot means operatively connected to said control valve for operating said control valve to reopen the main valve, conduit means connecting said pilot means to the pipe line, a pressure relief valve in said conduit means, orifice means in said conduit means regulating the rate of flow from said pipe line to said pressure relief valve, and a shut-off valve in said conduit means between said pipe line and said orifice means having an operative connection with said main valve for operation of said shut-off valve by final closing movement of said main valve.

4. In a fluid operator control system for a valve in a pipe line including a fluid pressure responsive valve operator operatively connected to said valve, and a fluid pressure responsive control valve having fluid communication with said valve operator and said pipe line for actuating said operator to close the main valve automatically in response to a pressure drop in the line; pressure-responsive pilot means operatively connected to said control valve for operating said control valve to reopen the main valve, bleed means in communication with said pilot means normally to cause the return of said pilot means to neutral position, conduit means connecting said pilot means to the pipe line, a pressure relief valve in said conduit means, orifice means in said conduit means regulating the rate of flow from said pipe line to said pressure relief valve, a shut-off valve in said conduit means between said pipe line and said orifice means having an operative connection with said main valve for operation of said shut-off valve by final closing movement of said main valve, and bleed means connected to said conduit means between said orifice means and said relief valve.

References Cited in the file of this patent

UNITED STATES PATENTS

| | | |
|---|---|---|
| 1,893,462 | Wait | Jan. 3, 1933 |
| 2,707,483 | Shafer | May 5, 1955 |